Oct. 13, 1964   R. NEUSCHOTZ   3,152,495
THREADED INSERT INSTALLING TOOL
Filed Feb. 12, 1963
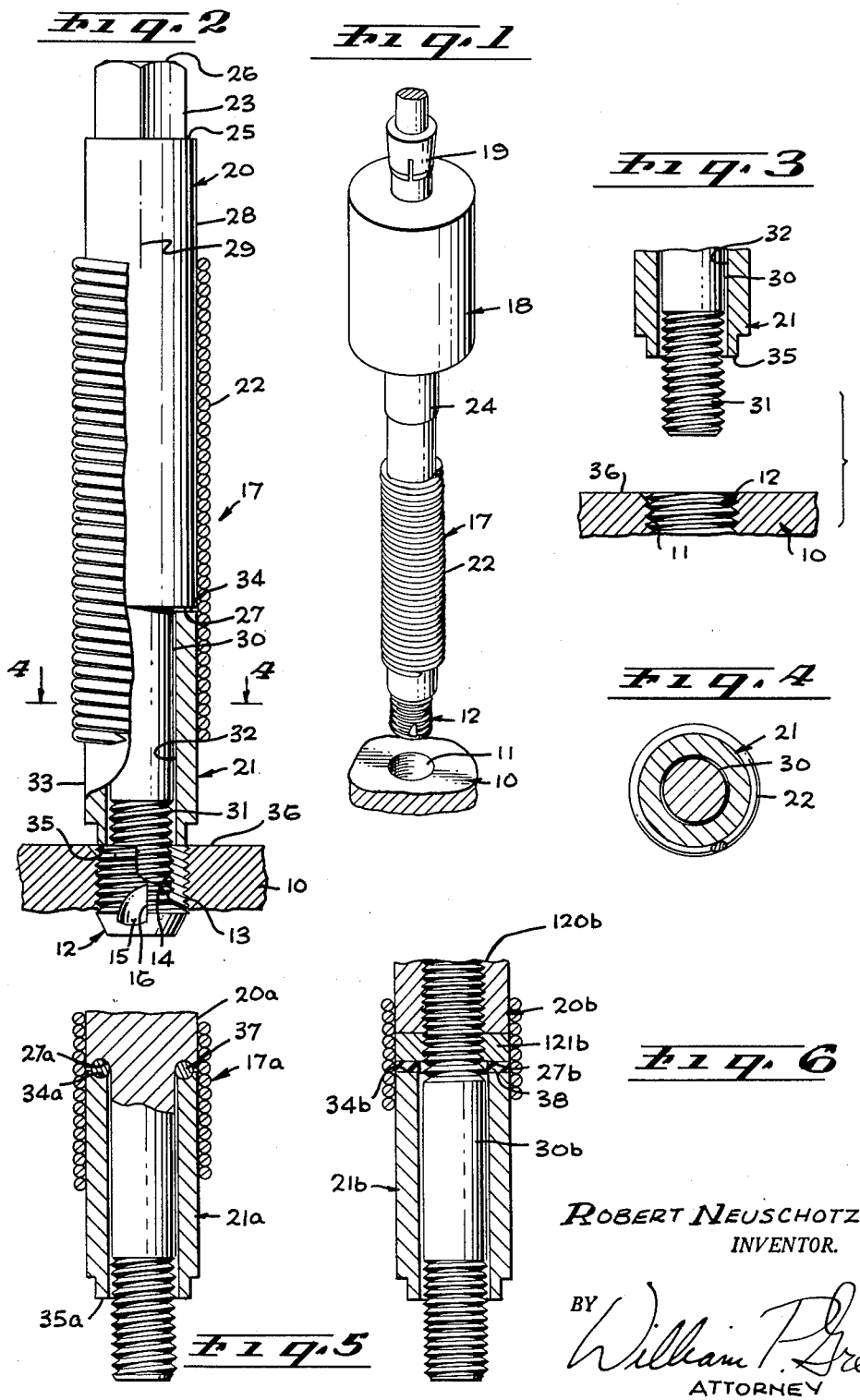
ROBERT NEUSCHOTZ
INVENTOR.
BY William P. Green
ATTORNEY

United States Patent Office 3,152,495
Patented Oct. 13, 1964

3,152,495
THREADED INSERT INSTALLING TOOL
Robert Neuschotz, 1162 Angelo Drive,
Beverly Hills, Calif.
Filed Feb. 12, 1963, Ser. No. 257,910
10 Claims. (Cl. 81—53)

This invention relates to improved tools for installing a threaded insert within a bore or recess in a carrier part.

The inserts with which the present tools are designed to function are of a general type having external threads adapted to be screwed into a carrier part and having a second set of threads, usually internal, adapted to be engaged with a mating stud or other threaded part, to secure that part to the carrier structure through the medium of the insert. For installing such an insert, a tool embodying the invention includes two sections mounted for relative rotary movement, with one of the sections having threads adapted to engage the discussed second set of threads on the insert, to thereby hold the insert during installation, and with the second section being constructed to exert axially inward force against the insert during the driving action. As the insert is screwed into position, the two sections turn in unison, to correspondingly turn the carried insert into its mating recess. After the insert has reached its fully installed position, the first section of the tool, which is in threaded engagement with the insert, is turned in an unscrewing direction to release it from the installed insert. In order to break the tight frictional interlock which is usually developed between the tool sections and the insert during a driving operation, the first section of the tool turns slightly relative to the second section as the unscrewing rotation commences, so that the tool may be easily removed without correspondingly removal of the insert.

This invention is concerned especially with a preferred way of connecting the sections together for the desired relative rotary motion as the insert is unscrewed. Specifically, I employ for connecting the sections together, a coil spring type of friction clutch element which is adapted to tightly grip the two sections upon rotation in one direction, and thereby transmit rotary motion in that direction, but is automatically releasable to a reduced friction condition upon rotation of the drive section in the opposite direction. Thus, the "first section" may turn freely relative to the second section, in an unscrewing direction, to permit the discussed type of insert releasing action upon initial unscrewing rotation of the first section. Preferably, the coil spring clutch element is a left-hand spring, to transmit rotation between the sections in a right-hand direction. The spring may be of uniform diameter along its length, and engage and grip two aligned cylindrical surfaces on the two sections of the tool.

The above and other features and objects of the invention will be better understood from the following detailed description of the typical embodiments illustrated in the accompanying drawing in which:

FIG. 1 is a perspective view showing a tool embodying the invention as it appears in use;

FIG. 2 is an enlarged partially sectional view through the tool of FIG. 1;

FIG. 3 shows fragmentarily an end portion of the tool, after withdrawal of the tool from a carried insert;

FIG. 4 is a transverse section taken on line 4—4 of FIG. 2;

FIG. 5 is a view similar to a portion of FIG. 2, but showing a variational arrangement; and FIG. 6 is a view similar to FIG. 5 but showing still another form of the invention.

In FIG. 1, I have illustrated at 10 a carrier part containing a bore or recess 11 in which a threaded insert 12 is to be screwed. The body 10 may for example be a casting of aluminum, other metal, plastic material, or the like, while insert 12 is normally formed of steel. As seen best in FIG. 2, the insert is of tubular configuration having external threads 13 to be screwed into threaded engagement with the inner wall of bore 11, and having internal threads 14 for ultimate connection to a mating bolt, stud, or other externally threaded part. Bore 11 may be prethreaded for engagement with external threads 13 of the insert, or may be initially unthreaded and of straight cylindrical configuration, with the insert being designed to tap mating threads within the carrier part as the insert is screwed into recess 11 to the installed FIG. 2 position. FIG. 2 typically illustrates a self-tapping type of insert, in which the external threads of the insert may be cut away at 15 to form an edge 16 shaped to tap threads in carrier part 10.

The tool for installing insert 12 within the carrier part is designated generally at 17, and is adapted to be connected to and driven by a conventional tapping attachment or head 18 which in turn is driven by the chuck 19 of a conventional drill press or portable drill. Tool 17 includes a first section 20 which is connected directly to and driven by the tapping attachment, a second section 21, and a coil spring clutch element 22. Section 20 has at its axially outer end a driving portion 23 shaped to fit within and be driven rotatively and axially by the power output socket or chuck 24 of tapping head 18. Socket 24 normally contains a square drive recess, and consequently the drive portion 23 of tool section 20 desirably is of corresponding square transverse cross section, with a transverse shoulder 25 being provided adjacent non-circular drive portion 23, so that socket 24 may exert axial force against either this shoulder or the outer end surface 26 of drive portion 23.

From the location of transverse surface 25 to the location of a second, oppositely directed transverse annular shoulder 27, section 20 has an external cylindrical surface 28 centered about the main axis 29 of the tool. Axially inwardly beyond shoulder 27, the diameter of section 20 is reduced to form a reduced diameter shank having an external cylindrical surface 30 terminating in a threaded end portion 31. The threads on end portion 31 of the shank are of uniform diameter, and constructed to mate with internal threads 14 formed in the insert 12. The major diameter of threads 31 may correspond to the diameter of the unthreaded portion 30 of the shank.

Section 21 of the tool forms an annular sleeve disposed about shank 30—31, and having an internal diameter 32 which is a rather close fit on the shank, but loose enough to allow free rotation of the sleeve relative to section 20. Externally, the sleeve or section 21 may have an outer surface 33 of the same diameter as surface 28 on section 20, and forming in effect a continuation of that surface. The transverse end surface 34 of sleeve 21 abuts annularly against transverse surface 27 of section 20. At its axially inner end, sleeve 21 has an annular surface 35, disposed transversely of axis 29, and adapted to abut axially against, and exert axially inward force on, the transverse end surface 36 of insert 12. Portion 31 of the shank of course projects axially beyond sleeve 21, to enable threaded connection of portion 33 into the insert.

When threads 31 and the mating threads within the insert are of right-hand configuration, the clutch spring 22 is a left-hand spring. This spring engages both of the surfaces 28 and 33 of the two tool sections 20 and 21, and tends by its own resilience to return to a normal diameter somewhat smaller than that of surfaces 28 and 33, so that the spring frictionally grips and engages these surfaces. This frictional engagement is sufficiently tight to retain the spring against axial movement relative to the engaged surfaces, so that no other means are required for holding the spring in its illustrated assembled position. Preferably, successive turns of the spring are in engagement with one another, though it is contemplated that in some instances a spring may be employed in which successive turns are spaced apart.

In using the tool of FIGS. 1 through 4, the operator first may manually screw insert 12 onto the projecting threaded end 31 of the tool shank, to a point of engagement of the insert with shoulder 35 of sleeve 21. Drive portion 23 of the tool is then inserted into socket or chuck 24 of tapping attachment 18, and the drill press or portable drill is energized to commence rotation of chuck 19. When thus driven, the tapping head 18 acts to rotate section 20 of the tool about axis 29, and simultaneously advance section 20 axially at a rate corresponding to the pitch or axial advancement of external threads 13 of the insert. Both the rotary and axial forces are transmitted to the insert through the two sections of the tool body. During the right-hand rotating movement by which the insert is screwed into carrier part 10, spring 22 acts to transmit such rotary motion directly from section 20 to section 21, so that the two sections act in all respects as a unitary structure.

After the insert has reached its fully installed position of FIG. 2, the rotation of the tool is halted. By this time, end surface 35 of sleeve 21 is in very tight frictional engagement with end surface 36 of the insert, and the surfaces 27 and 34 of the two sections of the tool may also be in tight binding engagement. It is in order to prevent the friction at these surfaces from unintentionally unscrewing insert 12 from the carrier part that section 20 of the tool is given a capacity for left-hand rotation relative to section 21. As section 20 is turned in a left-hand unscrewing direction, to unscrew shank 31 from engagement with the internal threads in the insert, sleeve 21 is initially held against rotation, by virtue of the tight binding engagement of surfaces 35 and 36. The coil spring 22 is capable of slipping in this left-hand direction and therefore does not transmit unscrewing rotation from section 20 to section 21. As soon as section 20 has turned in a left-hand direction through a very limited angle, the binding engagement at surfaces 35 and 36, and surfaces 27 and 34, is immediately relieved, and thereafter section 21 will be turned with section 20 by spring 22. Thus, an automatic release feature is provided which assures against unintentional withdrawal of the insert upon detachment of the tool.

FIG. 5 shows fragmentarily a variational form of tool 17a embodying the invention, which tool may be identical with that of FIGS. 1 through 4 except for the provision of a series of circularly spaced ball bearings 37 axially between surfaces 27a and 34a on sections 20a and 21a, to at all times maintain low frictional resistance to relative rotation of sections 20a and 21a, at the locations of surfaces 27a and 34a. As illustrated, surfaces 27a and 34a may be curved in cross section, in correspondence with the cross section of the balls, to retain the balls in place. Also a conventional pre-assembled unitary ball type thrust bearing, including balls and a pair of associated races, may if desired be substituted for balls 37. The FIG. 5 form of the invention assures that the friction between end surface 35a of section 21a and the driven insert will be greater than that between surfaces 27a and 34a, to assure retention of section 21a against rotation during the initial unscrewing rotary motion of section 20a.

FIG. 6 shows another form of the invention which may be identical with that of FIGS. 1 through 4 except that section 20b is formed of three separate parts 120b, 121b and 30b, and there is interposed between shoulder 27b of section 20b and shoulder 34b of section 21b (corresponding to shoulders 27 and 34 of FIG. 1), a low friction thrust bearing ring 38, formed of bronze, teflon, or any other suitable low friction bearing material. This ring of course serves the same purpose as do ball bearings 37 of FIG. 5. The three parts forming section 20b include a main body 120b, a separate shank or stud 30b threadedly connected into body 120b, and an externally cylindrical typically bronze lock nut 121b connected onto shank 30b and tightened against body 120b to secure parts 120b, 121b and 30b rigidly together.

What is claimed as new is:

1. A tool for screwing a threaded element into a bore, comprising a first section adapted to be turned about a predetermined axis, means mounted to turn with said first section and having threads for engaging and holding said element, a second section adapted to turn with and relative to said first section about said axis and pressed axially inwardly by the first section, means forming a shoulder positioned to be pressed axially inwardly against said element by said second section, and a coil spring friction clutch member operable to transmit rotary motion from said first section to said second section in a direction to screw said element into said bore but adapted to slip in the opposite direction to allow unscrewing rotary motion of the first section relative to said second section.

2. A tool for screwing a threaded element into a bore, comprising a first section adapted to be turned about a predetermined axis, means mounted to turn with said first section and having threads for engaging and holding said element, a second section adapted to turn with and relative to said first section about said axis and pressed axially inwardly by the first section, means forming a shoulder positioned to be pressed axially inwardly against said element by said second section, said two sections having cylindrical outer surfaces, and a coil spring friction clutch member engaging said outer surfaces of both sections operable to transmit rotary motion from said first section to said second section in a direction to screw said element into said bore but adapted to slip in the opposite direction to allow unscrewing rotary motion of the first section relative to said second section.

3. A tool for screwing a threaded element into a bore, comprising a first section adapted to be turned about a predetermined axis, means mounted to turn with said first section and having threads for engaging and holding said element, a second section adapted to turn with and relative to said first section about said axis and pressed axially inwardly by the first section, means forming a shoulder positioned to be pressed axially inwardly against said element by said second section, a coil spring friction clutch member operable to transmit rotary motion from said first section to said second section in a direction to screw said element into said bore but adapted to slip in the opposite direction to allow unscrewing rotary motion of the first section relative to said second section, and bearing means interposed axially between said two sections and transmitting axial forces therebetween.

4. A tool for screwing a threaded element into a bore, comprising a first section adapted to be turned about a predetermined axis, means mounted to turn with said first section and having threads for engaging and holding said element, a second section adapted to turn with and relative to said first section about said axis and pressed axially inwardly by the first section, means forming a shoulder positioned to be pressed axially inwardly against said element by said second section, a coil spring friction clutch member operable to transmit rotary motion from said first section to said second section in a direction to screw said element into said bore but adapted to slip in the opposite direction to allow unscrewing rotary motion of the first section relative to said second section, and a series of rolling bearing elements interposed axially between said two sections at different locations about said axis and transmitting axial forces between the sections.

5. A tool for screwing a threaded element into a bore, comprising a first section adapted to be turned about a predetermined axis, means mounted to turn with said first section and having threads for engaging and holding said element, a second section adapted to turn with and relative to said first section about said axis and pressed axially inwardly by the first section, means forming a shoulder positioned to be pressed axially inwardly against said element by said second section, said two sections having cylindrical outer surfaces of a common diameter and aligned axially with one another, and a coil spring friction clutch member engaging said outer surfaces of both sections operable to transmit rotary motion from said first section to said second section in a direction to screw said element into said bore but adapted to slip in the opposite direction to allow unscrewing rotary motion of the first section relative to said second section.

6. A tool for screwing a threaded element into a bore, comprising a first section adapted to be turned about a predetermined axis, means mounted to turn with said first section and having threads for engaging and holding said element, a second section adapted to turn with and relative to said first section about said axis and pressed axially inwardly by the first section, means forming a shoulder positioned to be pressed axially inwardly against said element by said second section, and a coil spring friction clutch member operable to transmit rotary motion from said first section to said second section in a direction to screw said element into said bore but adapted to slip in the opposite direction to allow unscrewing rotary motion of the first section relative to said second section, said coil spring clutch member being a left-hand spring and acting to transmit rotation from said first section to the second section in a right-hand direction.

7. A tool for screwing a threaded element into a bore, comprising a first section adapted to be turned about a predetermined axis, a shank projecting from and mounted to turn with said first section and having external threads for engaging and holding said element, a second section disposed about said shank and adapted to turn with and relative to said first section about said axis and pressed axially inwardly by the first section, means forming a shoulder positioned to be pressed axially inwardly against said element by said second section, and a coil spring friction clutch member disposed partially about each of said sections and operable to transmit rotary motion from said first section to said second section in a direction to screw said element into said bore but adapted to slip in the opposite direction to allow unscrewing rotary motion of the first section relative to said second section.

8. A tool for screwing a threaded element into a bore, comprising a first section adapted to be turned about a predetermined axis, a drive portion on said first section for engagement with a driving tool to turn said section about said axis, a shank projecting from and mounted to turn with said first section and having external threads for engaging and holding said element, a second section disposed about said shank and adapted to turn with and relative to said first section about said axis and pressed axially inwardly by the first section, means forming a shoulder positioned to be pressed axially inwardly against said element by said second section, said two sections having cylindrical outer surfaces of a common diameter and axially aligned with one another, and a coil spring friction clutch member disposed partially about each of said sections and engaging said outer surfaces of both sections and operable to transmit rotary motion from said first section to said second section in a direction to screw said element into said bore but adapted to slip in the opposite direction to allow unscrewing rotary motion of the first section relative to said second section.

9. A tool for screwing a threaded element into a bore, comprising a first section adapted to be turned about a predetermined axis, a drive portion on said first section for engagement with a driving tool to turn said section about said axis, a shank projecting from and mounted to turn with said first section and having external threads for engaging and holding said element, a second section disposed about said shank and adapted to turn with and relative to said first section about said axis and pressed axially inwardly by the first section, means forming a shoulder positioned to be pressed axially inwardly against said element by said second section, said two sections having cylindrical outer surfaces of a common diameter and axially aligned with one another, a coil spring friction clutch member disposed partially about each of said sections and engaging said outer surfaces of both sections and operable to transmit rotary motion from said first section to said second section in a direction to screw said element into said bore but adapted to slip in the opposite direction to allow unscrewing rotary motion of the first section relative to said second section, and a series of rolling bearing elements interposed axially between said two sections at different locations about said axis and transmitting axial forces between the sections, said coil spring clutch member being a left-hand spring and acting to transmit rotation from said first section to the second section in a right-hand direction.

10. A tool for screwing a threaded element into a bore, comprising a first section adapted to be turned about a predetermined axis, a drive portion on said first section for engagement with a driving tool to turn said section about said axis, means mounted to turn with said first section and having threads for engaging and holding said element, a second section adapted to turn with and relative to said first section about said axis and pressed axially inwardly by the first section, means forming a shoulder positioned to be pressed axially inwardly against said element by said second section, and a coil spring friction clutch member operable to transmit rotary motion from said first section to said second section in a direction to screw said element into said bore but adapted to slip in the opposite direction to allow unscrewing rotary motion of the first section relative to said second section.

References Cited in the file of this patent
UNITED STATES PATENTS
2,390,545   Lang _____ Dec. 11, 1945